United States Patent
Nikolic et al.

(10) Patent No.: US 9,619,828 B2
(45) Date of Patent: Apr. 11, 2017

(54) PRODUCT REVIEW SYSTEM AND METHOD

(75) Inventors: Milena Nikolic, London (GB); Nicolas Fortescue, Oxford (GB); Tyrone Nicholas, Croydon (GB); Miles Edward Barr, London (GB); German W Bauer, San Jose, CA (US); Satoe Ishii Haile, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 387 days.

(21) Appl. No.: 13/615,851

(22) Filed: Sep. 14, 2012

(65) Prior Publication Data

US 2014/0081805 A1 Mar. 20, 2014

(51) Int. Cl.
*G06Q 30/00* (2012.01)
*G06Q 30/06* (2012.01)
*G06Q 30/02* (2012.01)

(52) U.S. Cl.
CPC ..... *G06Q 30/0623* (2013.01); *G06Q 30/0282* (2013.01); *G06Q 30/0631* (2013.01)

(58) Field of Classification Search
CPC ............... G06Q 30/0623; G06F 17/30867
USPC ............... 705/26.61; 707/728, 731
See application file for complete search history.

(56) References Cited

U.S. PATENT DOCUMENTS

| | | | | |
|---|---|---|---|---|
| 8,788,944 | B1 * | 7/2014 | Gill et al. ................. | 715/744 |
| 2003/0111531 | A1 * | 6/2003 | Williams ................. | 235/383 |
| 2005/0114229 | A1 * | 5/2005 | Ackley et al. ............ | 705/26 |
| 2007/0185775 | A1 * | 8/2007 | Lawton .................... | 705/26 |
| 2009/0248666 | A1 * | 10/2009 | Ahluwalia ............... | 707/5 |
| 2011/0208669 | A1 * | 8/2011 | Ruhl et al. ............... | 705/347 |

OTHER PUBLICATIONS

Oxford American College Dictionary, Definition "Specific", Oxford University Press, Inc, Copyright © 2002, accessed on Jan. 13, 2016 at [http://eds.b.ebscohost.com/ehost/dictionary?sid=d2c9b214-8655-448d-96ae-4af9fb7fd9a4%40sessionmgr110&vid=3&hid=120].*
Lane, Slash, "Apple Rolling out more Advanced App Store Review System," Mar. 12, 2009, Apple Insider, accessed on Jan. 14, 2016 at [http://appleinsider.com/articles/09/03/12/apple_rolling_out_more_advanced_app_store_review_system].*
Google Play; www.play.google.com; Mar. 14, 2012.
CNET download.com; http://download.cnet.com; Mar. 14, 2012.
Blackberry App World; http://appworld.blackberry.com/webstore; Mar. 14, 2012.
Mobile Rated; www.mobilerated.com; Mar. 14, 2012.
Moren, Dan; "Apple Now Breaks Up App Store Reviews by Version"; Macworld; www.macworld.com; Mar. 12, 2009.

* cited by examiner

*Primary Examiner* — Resha Desai
*Assistant Examiner* — Lindsey Smith
(74) *Attorney, Agent, or Firm* — Morris and Kamlay LLP

(57) ABSTRACT

A customer with a customer device performs a search for reviews of a particular software product of interest to the customer. The customer is then presented with entries from reviewers that have the same device as the customer, or a device on which the product is expect to run or operate in a manner similar to how it runs on the customer's device.

10 Claims, 4 Drawing Sheets

PRODUCT REVIEW SYSTEM AND METHOD

FIELD

This disclosure pertains to an improved system in which product reviews are presented to online customers. More particularly a system and method is provided in which reviews from previous customers are obtained and are filtered so that only the reviewers associated with customer devices similar to the requesting customer's are presented.

BACKGROUND

Over the past few years, shopping on the Internet using on-line merchants has become popular. Customers shop on the Internet because they can check a large variety of products (and services) from many different manufacturers and other providers, literally from any corner of the world. Customers can also compare offers from different sources to determine which offer is the most attractive.

Moreover, merchants also find selling on the Internet very advantageous because the Internet gives them access to customers from many different places. Moreover, merchants can display information about the various products (including pictures, description, technical specifications, etc.) on line and therefore the merchant does not have to maintain an inventory of the products in stock or samples of the product. The on-line merchants can also present to potential customers reviews from other customers related either to particular products or the merchants.

Before the rise in the popularity of on line shopping, when making a decision, a customer had to rely mostly on advertisements about a product or listen to sales pitches from salespeople. Since the advertisements or sales pitches came from the manufacturers or other interested parties, the information from such advertisements was inherently suspect. Some information was also available from allegedly unbiased third parties, such as consumer groups or government agencies, but even this information could be suspect and was not easy to obtain. Moreover, the information from these third parties was limited to very popular products.

However, with the advent of the on line shopping, review sources, including other customers have also become available on the Internet for a wider variety of products. As a result, one interesting and somewhat unexpected phenomenon associated with shopping on the Internet is that online customers tend not to rely on traditional advertisements. Instead, anecdotal information suggests that a majority of Internet customers rely more on on-line reviews than on any other information source.

One problem with on-line reviews is that they are presently not well very organized and are frequently platform and device neutral. In many situations, how a product (and especially a software product) performs is very dependent on the platform that for which it has been designed; and/or the platform on which it is actually running. If a software product has been designed for one platform or device and is being used on a different platform or device, the software product may not perform in the same manner or may not run consistently on a different device or platform. In fact, in many situations, the version of the platform and/or the device may make the difference between a software product running perfectly and a software product running erratically, if at all. For example, a software product may run well on one manufacturer's device but not on another manufacturer's similar device, even though both may be using the same version of an operating system. Alternatively, a software product may be running well on only one of two devices devices when the two devices are identical in all aspects except that one runs an earlier version of an operating system than the other.

Therefore, there is a need to provide a system that overcomes the above-described problems with on-line reviews of products.

SUMMARY

A customer, in accordance with this disclosure, can obtain reviews of a certain product by initiating a search on his customer device, such as a desktop, a laptop, a smart phone, a tablet, etc. The typical product is a software product compatible with the customer device. The customer device is associated with a known specific parameter such as a device manufacturer, a manufacturer model number, or a platform having a predetermined version. The customer device then access a remote data base used to store a plurality of reviews from reviewers who have used the product.

Importantly, each review includes content such as text descriptive of the product, including a discussion of how well it performs, how easy it is to use, etc. The reviewer is presumably basing his comments on how the subject software product runs on his own reviewer device. The review and at least one characteristic parameter associated with the reviewer device are included in the review. More specifically, a tag is incorporated in the review. The tag includes information, such as the version of product and/or information on the reviewer device, such as device manufacturer, version number, platform, platform version, etc. This tag is also uploaded and associated with the respective review.

When the customer device accesses the data base, it can request content only from reviewer devices identical to the customer device, at least as indicated by the tag. Alternatively, many other if not all of the reviews may be downloaded in response to the request and the customer device then selects the reviews associated with identical or devices similar to its own.

The contents of several reviews are presented to the customer. Since these reviews originate from reviewers having devices the same or at least similar to the customer's device, the customer can be sure that the reviewers are presenting relevant information in the content. Optionally, the tags may be presented as well.

DETAILED DESCRIPTION

Figure 1:
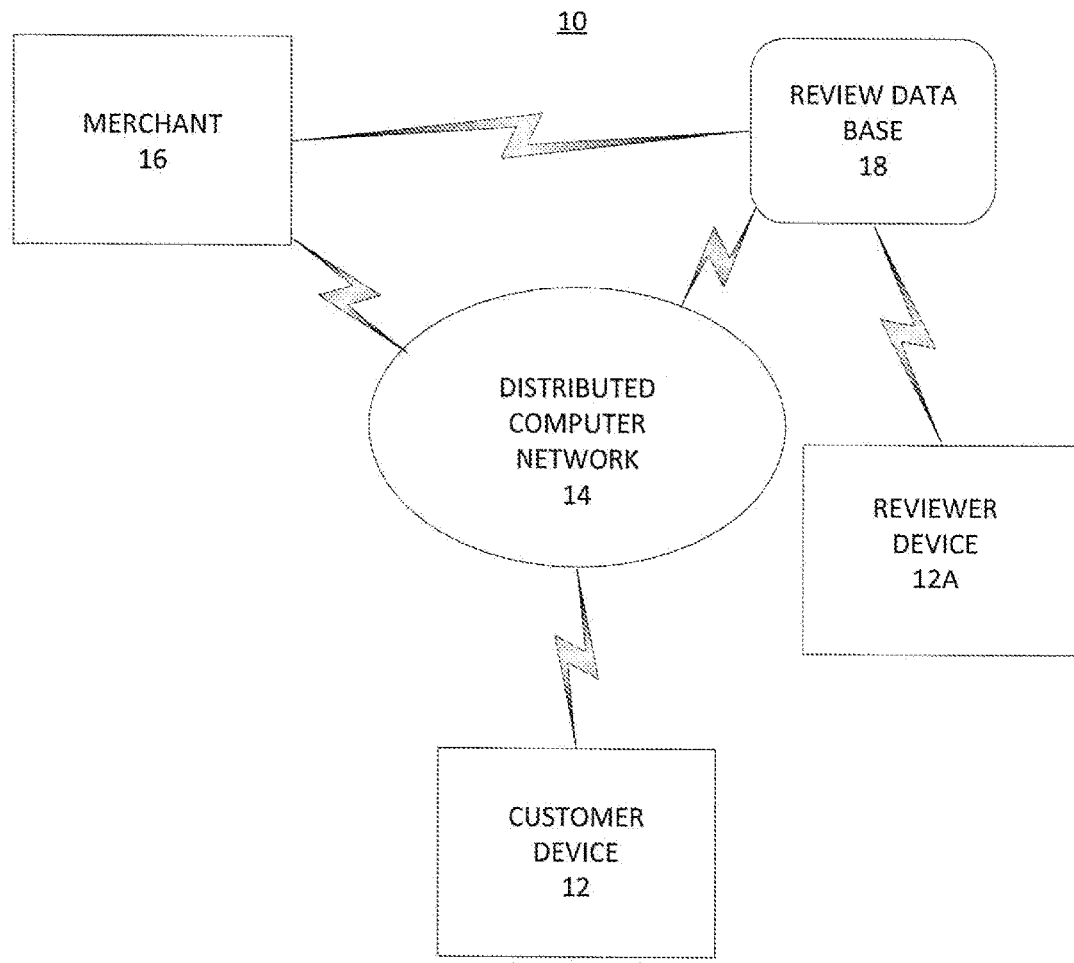
FIG. 1 shows a block diagram of a system constructed in accordance with this invention.

As described above, the present disclosure provides a potential customer of a product with a search result including review entries that are meaningful in that they are directly related to the device being used or being associated with the customer. The system 10 shown in FIG. 1 shows a customer using a customer device 12 to obtain information regarding a particular product. Although the invention may be used in other environments as well, for the purposes of this description it is assumed that the product is a software product, e.g. a game, a utility program, etc., that is intended to be downloaded and run on the customer device 12. The customer device 12 can be any device that can be used to present a software program to the customer, such as a hand-held cell phone, tablet, desk top computer, etc. Moreover, as discussed below, the same customer device could be used to browse for a software program, download it, and then run it for the customer. However, in some instances, the software program may be obtained by using one device to find a program and another device to present the program to the customer.

The customer device 12 has certain basic device characteristics that determine how a particular software product operates thereon and how the user will experience the software product. Generally, a software product is provided for the customer device 12, in any one of several conventional means (for example by preloading the product, downloading it using a setup program, streaming, etc.) As previously explained, the same product may play or operate differently on a different customer device.

As an example, a first customer may have a customer device such as first manufacturer's cell phone running on Operating System version 4.0 having a 4.0 screen and an audio output using a wireless communication standard such as BLUETOOTH® 3.0. A second customer may have an older customer device, such as a second manufacturer's device running on Operating System version 2.2, having a 2.2 screen and an audio output using another wireless communication standard such as BLUETOOTH® 2.0. The same version program may be running on the two different devices but, the customer on the first device may see a slower, jerkier motion, with smaller images and poorer sound quality than on the second device. The situation becomes more complicated when a software program, with the same name but different version, is run on the two different devices, since one version may be better suited for one of the devices, while a second version of the same software program may be better suited for the second device.

Returning to FIG. 1, a customer associated with customer device 12 runs a search for particular software using a standard browser or a dedicated search and/or shopping app over a distributed computer network 14, such as the Internet. Assuming for the purposes of this disclosure that a browser application is used, the browser may return one or more entries indicating that a software program similar or identical to the one that the customer is looking for is available from several sources, including a merchant 16. Either as part of the same search, or as a separate search, the customer obtains a list of reviews by others regarding the software product. Many merchants make such lists available on their own website (not shown) and a customer can search the merchant website and find the list.

In another embodiment, (depending on several factors, including for example the search terms used by the customer) the search results returned to the customer may include another, preferably independent, website with a plurality of reviews for the respective software program.

In either case, a plurality of entries is presented to the customer, each entry corresponding to a review of the software product. Preferably, these entries are obtained from an entry data bank 18. The entries can be obtained by the merchant (or reviewer) web site either directly, or through the Internet. The actual entries in review data base 18 are entered either directly or indirectly (as discussed below) by a reviewer using a reviewer device 12A.

Figure 2:
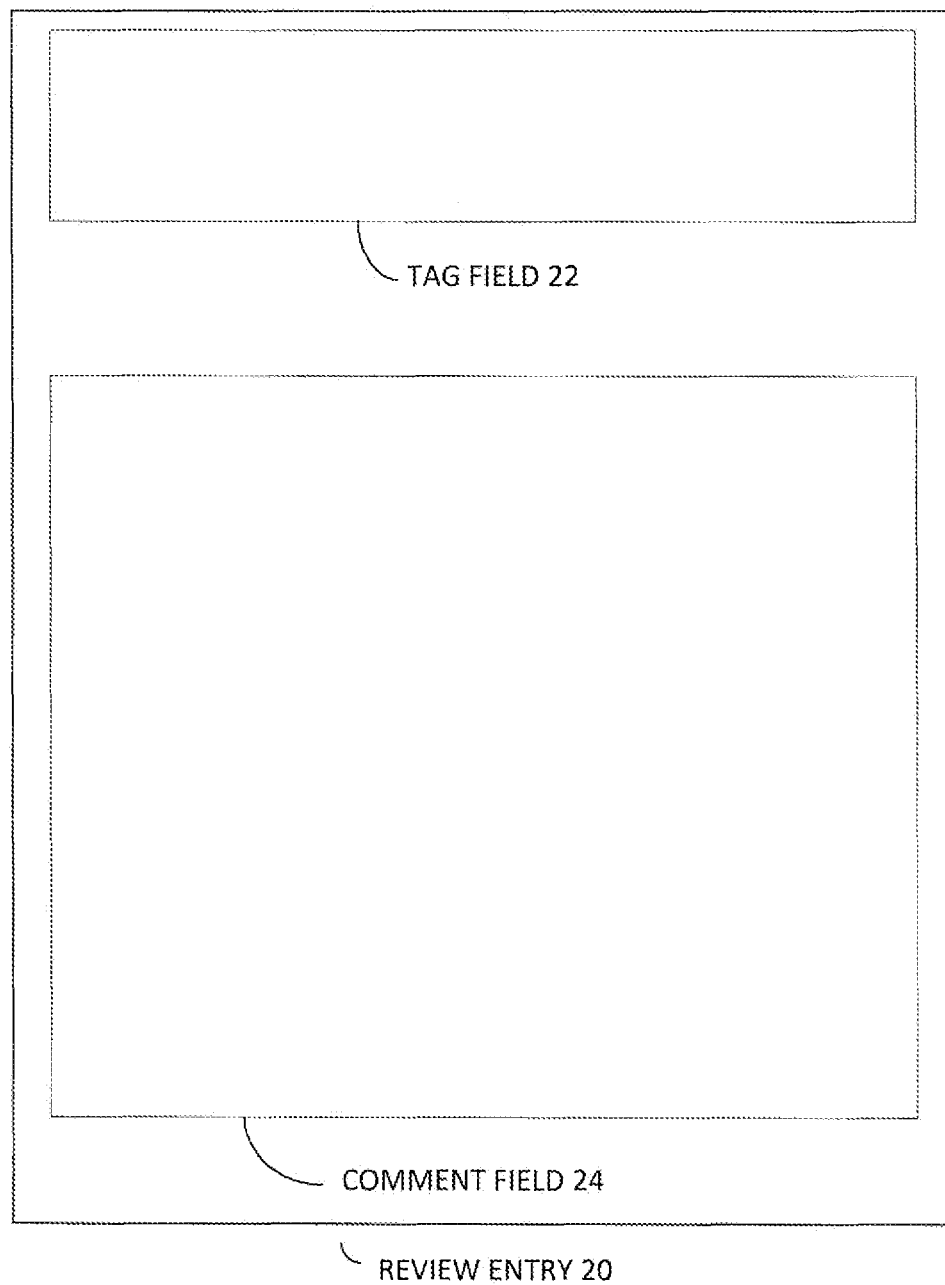
FIG. 2 shows details of a review entry that is part of a search result on the system of FIG. 1.

According to the present disclosure, as shown in FIG. 2, each entry 20 includes at least two components that are presented herein as fields. One field is a tag field 22 and the second field is a comment field 24. The tag field 22 includes various information, including the name or title of the software product, and one or more characteristics describing some parameters or attributes of the device associated with the respective reviewer. For example, the tag field may include the name of a particular game as the title or name. The additional information may include such data as the manufacturer of the reviewer device 12, its model number, the platform on which it is running and the size of its screen. The tags may also include additional information about the software product, such as the version number.

Each entry further includes a comment field 24 in which the reviewer has entered his comments about the software product, such as pros and cons of the software, its advantages and disadvantages, whether the reviewer liked the software product or not, various grades, etc. Each entry field is populated when a reviewer prepares and/or uploads his review. The comments may be prepared manually as a narrative by the reviewer. The tags can be populated either automatically by querying the reviewer device 12A, or manually, for example, by presenting a form to the reviewer on which the reviewer can indicate what device he is using, what platform he is using, etc. Some of the information from the reviewer may be used to obtain and provide further information for the tags. For example, if the reviewer is using a particular manufacturer's model XxxX, a look-up table or other means may be used to look up on what platform this model is running, what is its screen size, what is its processor, etc. The generation of the entries in the data base 18 is performed by separate software in the data base itself, by the merchant 16, by a website (not shown) soliciting and collecting reviews, or by some other entity, such as a website devoted to software product reviews, etc.

The customer is presented the entry 20 in its entirety, or the tag field may be hidden. Depending on the type of the customer device and the size of its screen, several reviews are presented to the customer in the form of a table, simple text or any other convenient format.

Figure 3:
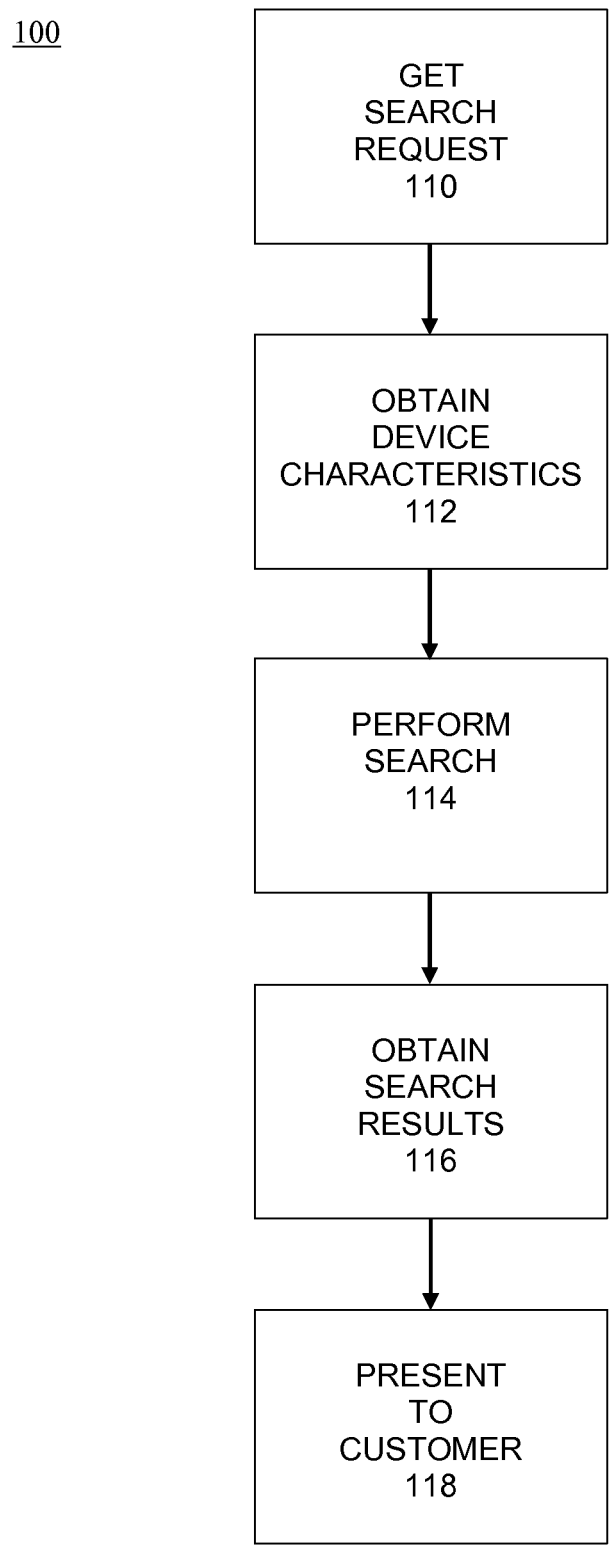
FIG. 3 shows a flow chart for generating review entries in accordance with this invention.

One mode of operation of the customer device 12 is illustrated in FIG. 3. In step 110 a search request is received from the respective customer by an appropriate application running on the device 12. In step 112 the relevant characteristics are obtained by the application either automatically by analyzing the device 12, or by asking the customer. In step 114 the application performs the search with the tag information included as part of the search criteria. In one alternate embodiment, if the relevant software product (e.g., the product that is being searched) is to be run on a different device and not device 12, the customer may so indicate in step 112. The search is performed on the entries of review data base 18, or on several such data bases.

In step 116 the relevant entries are obtained and in step 118 they are presented to the customer. In this embodiment, since the customer knows (or does not care about) the information in the tags, e.g., the manufacturer of his own device 12, the relevant platform on which it is running on, etc., this information need not be presented to the customer.

Figure 4:
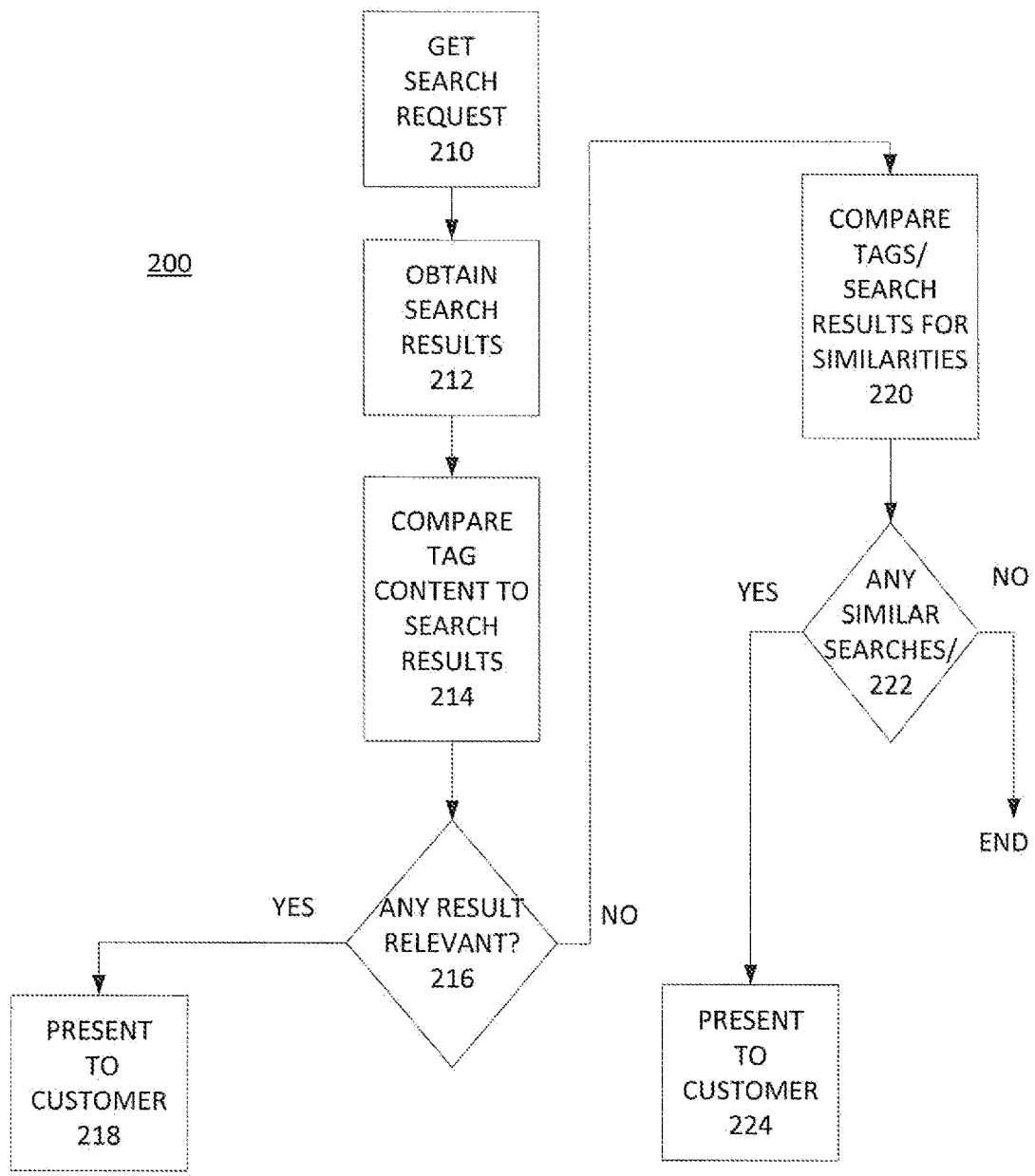
FIG. 4 shows a flow chart for presenting review entries in accordance with this invention.

Another alternate embodiment is shown by flow chart 200 in FIG. 4. In this embodiment, the search is entered by the customer in step 210. In step 212 the search results with all the entries relevant to the desired software product are obtained, each entry including tag field 22 with the described information. In step 214 the information about the device 12 (or another device of interest to the customer) is obtained and a comparison is made in step 214 with the information from the information field 212. In step 216 a determination is made as to whether sufficient entries have been obtained from the comparison in step 214. This may be a predetermined threshold number. If a sufficient number of entries have been found, then the entries are presented to the customer in step 218.

If not enough (or no) entries are found in step 214, then in step 220 an analyses is performed to find any entries relevant to other devices that may be sufficiently similar where the software product may be expected to behave or run in the same manner. For example, it may be recorded in a data base (either on the device 12 or in some other location) that a device running on the same platform but made by different manufacturers behaves the same way, or that two devices made by the same manufacturer but having different model numbers may run the same way. If enough relevant entries are found in step 222 then in step 224 they are presented to the customer. In that case, the relevant information may be shown to the customer since it is probably not known to him, or he is alerted to the fact that the entries are based on estimates and similar but not identical tag information.

As discussed above, preferably the processes of FIG. 3 or 4 are implemented using an application which itself is a program consisting of a series of instructions to a processor within the device 12, the application being recordable on a suitable computer readable medium stored in a memory and executed on the customer device 12.

Numerous modifications may be made to the disclosure without departing from its scope as defined in the appended claims.

We claim:

1. A computer-implemented method of presenting information to a customer device comprising the steps of:
    receiving, by said customer device, input to an application running on said customer device requesting product reviews relevant to a product configured to operate with said customer device;
    obtaining a manufacturer model number of said customer device by analysis of said customer device performed by the application running on said customer device;
    transmitting, by said customer device, a search, from said customer device over the Internet to a database comprising of a plurality of reviews, for reviews related to said product, each said review including content related to said product, each said review further comprising of a tag that indicates a manufacturer model number of a reviewer device;
    obtaining a plurality of reviews resulting from said search, wherein at least one of said plurality of reviews comprises of a tag that indicates a manufacturer model number that does not match the manufacturer model number of said customer device; and
    presenting, by the application running on said customer device, only reviews from the plurality of reviews that comprise a tag that indicates a manufacturer model number that matches the manufacturer model number of said customer device.

2. The method of claim 1, further comprising the step of including in said search a parameter that indicates the manufacturer model number of said customer device.

3. The method of claim 1, further comprising the step of selecting from said plurality of reviews only the reviews comprising a tag that indicates manufacturer model number that matches the manufacturer model number associated with said customer device.

4. The method of claim 1, further comprising the step of presenting an entry including content having text descriptive of the product to the customer.

5. The method of claim 4, further comprising the step of presenting said tag to the customer.

6. The method of claim 1, wherein said product is a software program configured to run on said customer device.

7. A non-transitory computer-readable medium that stores instructions executable by one or more processors to perform a method of assisting a customer in selecting a product, said product having been reviewed by several reviewers on respective reviewer devices, said reviews being available from a remote data base as entries, each entry including content related to the product and a tag that indicates a manufacturer model number of a reviewer device associated with the entry, comprising:
    instructions for analyzing a customer device comprising the one or more processors to determine a manufacturer model number of the customer device;
    instructions for initiating a request for reviews for the product;
    instructions for receiving the reviews from the remote data base as entries; and
    instructions for presenting the content of only reviews from entries with tags that indicate a manufacturer model number of the reviewer device that is the same as the manufacturer model number of the customer device.

8. The medium of claim 7, wherein if no reviews are obtained from entries with tags that indicate a manufacturer model number of the reviewer device that is the same as the manufacturer model number of the customer device, then further comprising the step of identifying reviews from entries with tags that indicate manufacturer model numbers of reviewer devices which are indicated by a second data base to behave in the same manner as a device with the manufacturer model number of the customer device when being operated with the product.

9. The medium of claim 7, wherein the product is a software product compatible with the customer device.

10. A computer-implemented system comprising:
    a device, comprising of one or more processors, that is configured to:
        receive input to an application running on said device requesting product reviews relevant to a product configured to operate with said device,
        obtain a manufacturer model number of said device by analysis of said device performed by the application running on said device,
        transmit a search over the Internet to a data base comprising a plurality of reviews, for reviews related to said product, each said review including content related to said product, each said review further comprising a tag that indicates a manufacturer model number of a reviewer device,
        receive a plurality of reviews resulting from said search, wherein at least one of said plurality of reviews comprises a tag that indicates a manufacturer model number that does not match the manufacture model number of said device, and
        present in the application running on the said device only reviews from the plurality of reviews that comprise a tag that indicates a manufacturer model number that matches the manufacturer model number of said device.

* * * * *